United States Patent
Kröselberg et al.

(10) Patent No.: US 11,868,452 B2
(45) Date of Patent: Jan. 9, 2024

(54) METHOD FOR AUTOMATICALLY REGISTERING A USER ON A FIELD DEVICE, AND AUTOMATION SYSTEM

(71) Applicant: Siemens Schweiz AG, Zürich (CH)

(72) Inventors: Dirk Kröselberg, Munich (DE); Carl Henrik Denis, Munich (DE); Silvio Riener, Munich (DE)

(73) Assignee: SIEMENS SCHWEIZ AG

( * ) Notice: Subject to any disclaimer, the term of this patent is extended or adjusted under 35 U.S.C. 154(b) by 55 days.

(21) Appl. No.: 17/023,480

(22) Filed: Sep. 17, 2020

(65) Prior Publication Data
US 2021/0097156 A1    Apr. 1, 2021

(30) Foreign Application Priority Data
Sep. 27, 2019    (EP) .................................. 19200114

(51) Int. Cl.
G06F 21/31    (2013.01)
G06F 21/60    (2013.01)

(52) U.S. Cl.
CPC .......... G06F 21/31 (2013.01); G06F 21/602 (2013.01)

(58) Field of Classification Search
CPC ............................... G06F 21/31; G06F 21/602
USPC ........................................................ 726/18
See application file for complete search history.

(56) References Cited

U.S. PATENT DOCUMENTS

| | | | |
|---|---|---|---|
| 8,015,409 B2* | 9/2011 | Wilkinson, Jr. | H04L 9/3273 713/168 |
| 8,132,240 B2* | 3/2012 | Jurisch | G05B 19/0428 713/168 |
| 9,342,979 B2* | 5/2016 | Fink | G08C 17/02 |
| 9,805,528 B1* | 10/2017 | Toepke | G07C 9/27 |
| 10,834,094 B2* | 11/2020 | Galpin | H04L 63/0853 |
| 2009/0052667 A1* | 2/2009 | Iwamura | H04N 21/42204 380/278 |
| 2013/0086646 A1 | 4/2013 | Poschmann et al. | |
| 2013/0237148 A1* | 9/2013 | McCann | H04W 48/10 455/41.1 |
| 2014/0094143 A1* | 4/2014 | Ayotte | G06Q 20/00 455/411 |
| 2015/0046697 A1* | 2/2015 | Galpin | H04L 63/0853 713/155 |
| 2015/0215321 A1 | 7/2015 | Fries et al. | |

(Continued)

FOREIGN PATENT DOCUMENTS

WO    WO 2018064765 A1    4/2018

*Primary Examiner* — Teshome Hailu
(74) *Attorney, Agent, or Firm* — Schmeiser, Olsen & Watts LLP

(57) ABSTRACT

Provided is a method for automatically registering a user on a field device for the purpose of administering the field device, including a) providing user information on the basis of an identity of the user and an identity of the field device by a security device; b) transmitting the provided user information to a mobile device of the user; c) generating field-device-specific registration information on the basis of the transmitted user information by the mobile device; and d) registering the user on the field device by the generated registration information. This method has the particular advantage that a highly secure infrastructure can be used for administering access information for administering the field devices without problems arising during the registration process.

18 Claims, 2 Drawing Sheets

(56) References Cited

U.S. PATENT DOCUMENTS

| | | | |
|---|---|---|---|
| 2016/0088021 A1* | 3/2016 | Jayanti Venkata | H04L 63/104 |
| | | | 726/1 |
| 2019/0056849 A1* | 2/2019 | Luber | G06F 3/0481 |
| 2019/0114879 A1* | 4/2019 | Schäuble | G08B 5/36 |
| 2019/0132012 A1* | 5/2019 | De Groot | H04B 1/38 |
| 2019/0147179 A1* | 5/2019 | Maneval | G05B 19/0425 |
| | | | 726/27 |
| 2019/0188008 A1* | 6/2019 | Schmoetzer | G06F 9/44505 |
| 2019/0219988 A1* | 7/2019 | Weiss | G01P 15/0802 |
| 2019/0286626 A1* | 9/2019 | Shibamura | G06F 16/22 |
| 2020/0183350 A1* | 6/2020 | Rümmele-Werner | |
| | | | G05B 19/0428 |
| 2020/0252236 A1* | 8/2020 | Mayer | H04L 12/2825 |
| 2020/0287895 A1* | 9/2020 | Hottgenroth | H04L 63/083 |
| 2020/0319013 A1* | 10/2020 | Palatini | G06T 7/62 |
| 2022/0337611 A1* | 10/2022 | Brazao | H04L 9/0891 |

* cited by examiner

METHOD FOR AUTOMATICALLY REGISTERING A USER ON A FIELD DEVICE, AND AUTOMATION SYSTEM

CROSS-REFERENCE TO RELATED APPLICATIONS

This application claims priority to European Application No. 19200114.7, having a filing date of Sep. 27, 2019, the entire contents of which are hereby incorporated by reference.

FIELD OF TECHNOLOGY

The following relates to a method for automatically registering a user on a field device and to an automation system.

BACKGROUND

Administration of a field device by a user usually requires the user to register with the field device by using a combination of username and password. The field device can have different user accounts, for example, different administration operations being performable on the basis of the user account. In particular in the case of industrial installations, such as automation systems, which require regular maintenance by service engineers of the manufacturer, there is the problem in this instance that the access data used are frequently very simple in order to avoid complications during the registration process. The use of unique and complex passwords for different field devices would increase security, but is implementable only with difficulty in practice. Manual input of long and complex passwords is time-consuming and error-prone, for example.

A further problem that arises is the issue of how the access data used can be stored and provided. Depending on the requirements of the operator of a field device or automation system, central, decentralized or else local systems are possible in this instance. In particular in the case of older field devices, it is frequently not possible or not easily possible to make password changes or to incorporate these into an applicable automated access system.

SUMMARY

An aspect relates to an improved method for automatically registering a user on a field device. According to a first aspect, a method for automatically registering a user on a field device for the purpose of administering the field device is proposed. In a step a), user information is provided on the basis of an identity of the user and an identity of the field device by a security device. In a step b), the provided user information is transmitted to a mobile device of the user. In a step c), the mobile device generates field-device-specific registration information on the basis of the transmitted user information. In a step d), the user is registered on the field device by the generated registration information.

This method has the particular advantage that a highly secure infrastructure can be used for administering access information for administering the field devices without problems arising during the registration process. In particular, manual input of complex and long passwords frequently results in input errors, which is avoided in the present case because a seamless chain from the security device to registration on the field device is provided.

A field device in the present instance is understood to mean in particular any "smart" device that has a sensor system and/or data processing, for example. Such field devices can, in particular, be configured to adapt their behavior and/or their functions to the particular desired purpose. To this end, the field device has an input capability, which is in particular protected, for example by a password. In order to administer the field device, it is therefore first necessary to input the password, for example. In particular, the field device has control software, such as an operating system, by which the field device is administrable.

Examples of field devices are smart home devices, such as smart light switches, door locks, ventilation and/or heating systems and the like, but also automated teller machines, ticket machines, medical-engineering devices, such as x-ray units or CT scanners, and also industrial production installations. In particular, a plurality of field devices can form an automation system. Field devices that form an automation system can be administered in particular collectively from a control computer.

Administration of a field device is understood to mean any operation on the field device that changes a configuration or setting on the field device. Administration is understood to mean in particular service operations, such as updating software or firmware, or other function tests. A normal mode of the field device is therefore in particular not administration of the field device. An operator, such as for example a doctor, making settings on an x-ray unit and starting an x-ray scan is not administration of the field device.

Depending on the type and configuration of the field device, there may be provision for central administration access, such as for example administrator access, or there may be provision for different user groups, with a respective user group having allocated rights. There may also be provision for an individual user account for each user, each user account having allocated individual rights for administering the field device.

These field devices are in particular not connected to the Internet or at least do not have access allowing administration of the field device available from the Internet. This is frequently the case with security-critical field devices, for example. In this way, it is possible to ensure that a hacker cannot gain administration access to the field device via the Internet, for example. Registration on the field device for the purpose of administering the field device, for example by a service engineer, can take place only locally in the case of such field devices, that is to say that the service engineer requires physical access to the field device.

The security device is in the form of a password safe, for example. The security device may be accessible via the Internet or else an internal intranet, for example. The security device is configured for cryptographically storing user information for one or more field devices. User information can be separate information for each individual user and for each field device. Alternatively, there may be provision for multiple users to form a user group, the user information of which is then identical. The user information is different at least for each field device from a number of field devices. The circumstance that the user information is provided on the basis of the identity of the user and the identity of the field device is understood in the present instance to mean that precisely the user information allocated to the respective user for the respective field device is provided.

Providing the user information is understood to mean for example that the security device reads the information from an internal memory and outputs it, for example to a communication unit of the security device, such as for example a modem.

The user information is then transmitted to the mobile device of the user. The mobile device is in particular a smartphone or a notebook of the user. The mobile device sets up a communication connection to the security device, the connection being used to transmit the user information.

The communication connection can comprise a LAN connection, a WLAN connection, a mobile radio connection, a Bluetooth connection and the like, for example. The communication connection is in particular protected by encryption. The user information can be transmitted in particular at a time directly before registration or else distinctly before registration on the field device. By way of example, the user information can be transmitted when the user is still in the office, before he travels to the field device. Alternatively, transmission can take place immediately before registration.

Whenever the mobile device has received the user information, it then takes this user information as a basis for generating registration information. This is understood to mean in particular that the mobile device decrypts user information transmitted in encrypted fashion, for example, and thus generates the registration information. Further security factors can be used in this case, such as for example a chip card reader or input of a password or biometric information, such as a fingerprint or an iris scan.

In embodiments, generation of the registration information can also be understood to mean that the mobile device leaves the content of the received user information unchanged and puts the information into a data format readable by the field device and/or packs the information into a data packet transmittable in accordance with a specific protocol. The mobile device then has the function of a wireless modem, for example. In this respect, "generation" is not necessarily intended to be understood to mean manipulation of the user information or generation of new data, but rather the registration information may also be identical to the user information.

The generated registration information is suitable for registering or logging in the user on the field device. The registration information can be transmitted to the field device in different ways. This is accomplished automatically, with a scanner, a microphone, a data connection or else an acceleration sensor being able to be used. By way of example, the mobile device generates a modulated tone sequence containing the registration information, the tone sequence being picked up by a microphone and the registration information being determined therefrom by demodulation.

There may be provision for the user to first input a username or access name. This information is already contained in the registration information, however, so that the user does not need to perform manual input.

Advantageously, the method furthermore allows registration of the user on the field device without the user gaining knowledge of the registration information. Security is therefore increased further.

When there are a plurality of field devices, the registration information is different for each of the field devices, so that it is not possible for the user to use just one piece of registration information to register on multiple field devices. This contributes to increased security.

According to embodiments of the invention, the security device is arranged locally to the field device.

In this context, locally is understood to mean that the security device is in the same room as the field device, no further than 3 meters away from the field device. In the case of large devices, such as for example a rolling installation or a printing machine, the local arrangement relates in particular to a central control computer, if one is present.

Physical access to the security device is therefore possible only if there is also physical access to the field device. Manipulation of the security device is therefore hampered. The security device in this instance is in the form of a mini-PC that can be supplied with current by a USB port, for example.

According to a further embodiment of the method, the provided user information is transmitted between the mobile device and the security device by a local communication connection.

A local communication connection is understood to mean in particular a short-range communication connection. Reliable communication is possible in this instance only when there is a short distance, for example less than 10 meters, less than 5 meters, more less than 3 meters, under 1 meter, between the mobile device and the security device. This can apply both to wired communication connections and to wireless communication connections. Examples of such a communication connection are Bluetooth or NFC (near field communication).

In particular, the security device in this embodiment is not connected to the Internet or an intranet, so that manipulation of the security device remotely is impossible. This embodiment significantly increases security.

According to a further embodiment of the method, the security device is configured for cryptographically secure storage of access data for at least one user group from a plurality of user groups of the field device.

According to a further embodiment of the method, there is provision for a receiving apparatus, couplable to the field device, that registers on the field device as an interface device and uses a communication connection to the mobile device to receive the registration information from the mobile device and registers the user on the field device.

This embodiment is particularly advantageous because a field device can be rendered able to be used for the automatic registration without the field device itself needing to be changed. The receiving apparatus is, in particular, coupled by an interface that is already present on the field device, by wire. In particular, an appropriate receiving apparatus can be configured for any known interface.

An interface device is understood to mean for example an input device such as a keyboard, a computer mouse and/or a joystick. The coupled receiving apparatus is not actually in the form of an interface device, but rather merely registers as one with the field device. The receiving apparatus can also be the to simulate a genuine interface device. The receiving apparatus is therefore able to transmit inputs typical of an interface device to the field device. By way of example, a USB dongle can register with the field device as a keyboard configured for inputting character strings in accordance with known standards.

In embodiments, the receiving apparatus is in the form of a USB dongle and coupled to the field device by a USB interface. This embodiment has the advantage that any field device that has a USB interface can be used for the method. The USB dongle registers with the field device as a keyboard. The USB dongle has a Bluetooth modem, for example, and can set up a Bluetooth connection to the mobile device.

The communication connection to the receiving apparatus is in particular a local communication connection. The communication connection is in particular protected by encryption.

According to a further embodiment of the method, the mobile device sends an administration input for administering the field device to the receiving apparatus in addition to the registration information and after the user has been registered on the field device.

An administration input in this instance can be any command inputtable via the interface device that simulates the receiving apparatus. By way of example, a mouse click on specific coordinates can be "simulated", or a command line window can be called and a command can be input and confirmed.

As such, updates can be performed invisibly to all intents and purposes, for example, without the user needing to take manual action. In particular in the case of security-critical administration operations, security can be increased further in this way.

In embodiments, it is thus also possible to produce and/or execute entire scripts on the field device.

According to a further embodiment of the field device, the mobile device generates the registration information by a cryptographic method on the basis of the user information.

A cryptographic method is understood to mean in particular the use of encryption and/or an authentication method. Examples thereof are PKI (public key infrastructure) or OTP (one time pad).

According to a further embodiment of the method, step a) comprises authenticating the user on the mobile device and/or on the security device.

By way of example, the user authenticates himself on the mobile device by his fingerprint, whereupon the mobile device authenticates itself with the security device as the mobile device of the user. This ensures that the user information is transmitted only to the mobile device that actually belongs to the user who wishes to register with the field device.

To increase security, there may also be provision for two-stage authentication of the user. By way of example, the user first needs to authenticate himself to the mobile device, so that the latter can receive the user information from the security device. For the purpose of authentication, the user information can have for example a second factor, individual to each user, that the user needs to provide before the field-device-specific registration information can be generated. The second factor can be a password, an item, such as a chip card, or else a biometric feature of the user.

According to a second aspect, an automation system having a number of field devices and at least one security device is proposed. Each field device from the number of field devices is administrable by at least one user, wherein administration of a respective instance of the field devices requires registration with the respective field device by field-device-specific registration information. A mobile device of the at least one user is configured for retrieving user information from the security device on the basis of an identity of the at least one user and an identity of the respective field device. The mobile device is furthermore configured for generating the field-device-specific registration information on the basis of the retrieved user information and for outputting the generated registration information.

This automation system can comprise one or more field devices. In particular, the automation system is an industrial production installation having a multiplicity of field devices, all or some of which may be administrable via a central control computer. Registration on the control computer therefore corresponds to registration on all field devices administrable via the control computer. In this respect, the control computer can be regarded as a field device.

The at least one user is registered on one of the field devices by using the method of the first aspect. The embodiments and features described for the proposed method apply to the proposed automation system accordingly, with the aforementioned advantages also arising.

A field device in the present instance is understood to mean in particular any "smart" device that has a sensor system and/or data processing, for example. Such field devices can, in particular, be configured to adapt their behavior and/or their functions to the particular desired purpose. To this end, the field device has an input capability, which is in particular protected, for example by a password. In order to administer the field device, it is therefore first necessary to input the password, for example. In particular, the field device has control software, such as an operating system, by which the field device is administrable.

Examples of field devices are smart home devices, such as smart light switches, door locks, ventilation and/or heating systems and the like, but also automated teller machines, ticket machines, medical-engineering devices, such as x-ray units or CT scanners, and also industrial production installations. In particular, a plurality of field devices can form an automation system. Field devices that form an automation system can be administered in particular collectively from a control computer.

Administration of a field device is understood to mean any operation on the field device that changes a configuration or setting on the field device. Administration is understood to mean in particular service operations, such as updating software or firmware, or other function tests. A normal mode of the field device is therefore in particular not administration of the field device. An operator, such as for example a doctor, making settings on an x-ray unit and starting an x-ray scan is not administration of the field device.

Depending on the type and configuration of the field device, there may be provision for central administration access, such as for example administrator access, or there may be provision for different user groups, with a respective user group having allocated rights. There may also be provision for an individual user account for each user, each user account having allocated individual rights for administering the field device.

These field devices are in particular not connected to the Internet or at least do not have access allowing administration of the field device available from the Internet. This is frequently the case with security-critical field devices, for example. In this way, it is possible to ensure that a hacker cannot gain administration access to the field device via the Internet, for example. Registration on the field device for the purpose of administering the field device, for example by a service engineer, can take place only locally in the case of such field devices, that is to say that the service engineer requires physical access to the field device.

The security device is in the form of a password safe, for example. The security device may be accessible via the Internet or else an internal intranet, for example. The security device is configured for cryptographically storing user information for one or more of the field devices. User information can be separate information for each individual user and for each field device. Alternatively, there may be provision for multiple users to form a user group, the user information of which is then identical. The user information is different at least for each field device from a number of field devices. The circumstance that the user information is retrieved on the basis of the identity of the user and the identity of the field device is understood in the present instance to mean that precisely the user information allocated to the respective user for the respective field device is retrieved. This is accomplished in particular under the control of the security device.

The mobile device retrieves the user information from the security device. By way of example, the security device provides the user information and the latter is transmitted to the mobile device. For example, the security device reads the user information from an internal memory and sends the information to the mobile device via a communication unit of the security device, such as for example a modem.

The mobile device is in particular a smartphone or a notebook of the user. The mobile device sets up a communication connection to the security device, the connection being used to transmit the user information. The communication connection can comprise a LAN connection, a WLAN connection, a mobile radio connection, a Bluetooth connection and the like, for example. The communication connection is in particular protected by encryption. The user information can be transmitted in particular at a time directly before registration or else distinctly before registration on the field device. By way of example, the user information can be transmitted when the user is still in the office, before he travels to the field device. Alternatively, transmission can take place immediately before registration.

Whenever the mobile device has received the user information, it then takes this user information as a basis for generating registration information. This is understood to mean in particular that the mobile device decrypts user information transmitted in encrypted fashion, for example, and thus generates the registration information. Further security factors can be used in this case, such as for example a chip card reader or input of a password or biometric information, such as a fingerprint or an iris scan.

In embodiments, generation of the registration information can also be understood to mean that the mobile device leaves the content of the received user information unchanged and puts the information into a data format readable by the field device and/or packs the information into a data packet transmittable in accordance with a specific protocol. The mobile device then has the function of a wireless modem, for example. In this respect, "generation" is not necessarily intended to be understood to mean manipulation of the user information or generation of new data, but rather the registration information may also be identical to the user information.

The generated registration information is suitable for registering or logging in the user on the field device. To this end, the registration information is output by the mobile device, in particular transmitted to the field device. The registration information can be transmitted to the field device in different ways. This is accomplished automatically, with a scanner, a microphone, a data connection or else an acceleration sensor being able to be used. By way of example, the mobile device generates a modulated tone sequence containing the registration information, the tone sequence being picked up by a microphone and the registration information being determined therefrom by demodulation.

There may be provision for the user to first input a username or access name. This information is already contained in the registration information, however, so that the user does not need to perform manual input.

When there are a plurality of field devices, the registration information is different for each of the field devices, so that it is not possible for the user to use just one piece of registration information to register on multiple field devices. This contributes to increased security.

According to one embodiment of the automation system, the number of field devices forms a local group, wherein the security device is arranged locally to the group.

A local group is understood to mean for example a number of field devices arranged in close physical proximity to one another that are at a distance of at least one of less than 10 meters, less than 5 meters, more less than 3 meters, and under 1 meter, from one another. In particular, individual instances of the field devices of the local group can also cooperate and/or be dependent on one another in terms of function.

A local arrangement in this instance is understood to mean an arrangement at a short distance.

According to a further embodiment of the automation system, the mobile device is configured for retrieving the user information by a local communication connection to the security device.

A local communication connection is understood to mean in particular a short-range communication connection. Reliable communication is possible in this instance only when there is a short distance, for example less than 10 meters, less than 5 meters, more less than 3 meters, under 1 meter, between the mobile device and the security device. This can apply both to wired communication connections and to wireless communication connections. Examples of such a communication connection are Bluetooth or NFC (near field communication).

According to a further embodiment of the automation system, at least one of the field devices from the number has a coupled receiving apparatus that registers with the field device as an interface device, wherein the mobile device is configured for making a communication connection to the receiving apparatus, wherein the mobile device is configured for transmitting the registration information to the receiving apparatus via the communication connection and the receiving apparatus is configured for registering the user on the field device.

This embodiment is particularly advantageous because the field device can be rendered able to be used for the automatic registration without the field device itself needing to be changed. The receiving apparatus is, in particular, coupled by an interface that is already present on the field device, by wire. In particular, an appropriate receiving apparatus can be configured for any known interface. It is therefore even possible to use obsolete field devices accordingly for the available interface.

An interface device is understood to mean for example an input device such as a keyboard, a computer mouse and/or a joystick. The coupled receiving apparatus is not actually in the form of an interface device, but rather merely registers as one with the field device. The receiving apparatus can also be the to simulate a genuine interface device. The receiving apparatus is therefore able to transmit inputs typical of an interface device to the field device. By way of example, a USB dongle can register with the field device as a keyboard configured for inputting character strings in accordance with known standards.

In embodiments, the receiving apparatus is in the form of a USB dongle and coupled to the field device by a USB interface. This embodiment has the advantage that any field device that has a USB interface can be used for the method. The USB dongle registers with the field device as a keyboard. The USB dongle has a Bluetooth modem, for example, and can set up a Bluetooth connection to the mobile device.

The communication connection to the receiving apparatus is in particular a local communication connection. The communication connection is in particular protected by encryption.

According to a further embodiment of the automation system, the mobile device is configured for generating an administration input for administering the field device and for transmitting the administration input to the receiving apparatus after the user has been registered on the field device.

An administration input in this instance can be a further command inputtable via the interface device that simulates the receiving apparatus. By way of example, a mouse click on specific coordinates can be "simulated", or a command line window can be called and a command can be input and confirmed.

As such, updates can be performed invisibly to all intents and purposes, for example, without the user needing to take manual action. In particular in the case of security-critical administration operations, security can be increased further in this way.

In embodiments, it is thus also possible to produce and/or execute entire scripts on the field device.

According to a further embodiment of the automation system, the mobile device is configured for retrieving the user information and/or for generating the registration information by a cryptographic method.

A cryptographic method is understood to mean in particular the use of encryption and/or an authentication method. Examples thereof are PKI (public key infrastructure) or OTP (one time pad).

According to a further embodiment of the automation system, a communication connection for retrieving the user information and/or a communication connection for transmitting the registration information is a local communication connection.

Furthermore, a computer program product is proposed that prompts performance of the method as illustrated above on a program-controlled device.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by the transmission of an appropriate file with the computer program product or the computer program means.

According to a further aspect, an automation system having a number of field devices and at least one security device arranged locally to one of the field devices from the number is proposed. Each field device from the number is administrable by users, administration of one of the field devices requiring registration with the respective field device by field-device-specific registration information. A mobile device of the user is configured for retrieving user information from the security device on the basis of an identity of the user and an identity of the field device by a local communication connection. The mobile device is furthermore configured for generating the field-device-specific registration information on the basis of the retrieved user information and for outputting the generated registration information.

Advantageously, this allows security for accessing security-critical field devices to be increased, since the physical presence of the user is required both for retrieving the user information and for registration on the respective field device. The user is authenticated by the mobile device in this instance, for example by a biometric characteristic. The embodiments and features of the automation system according to the second aspect apply to the proposed automation system accordingly.

To increase security, there may also be provision for two-stage authentication of the user. By way of example, the user first needs to authenticate himself to the mobile device, so that the latter can receive the user information from the security device. For the purpose of authentication, the user information can have for example a second factor, individual to each user, that the user needs to provide before the field-device-specific registration information can be generated. The second factor can be a password, an item, such as a chip card, or else a biometric feature of the user.

Further possible implementations of embodiments of the invention also encompass combinations not explicitly mentioned of features or embodiments described above or below in relation to the exemplary embodiments. In this case, a person skilled in the art will also add individual aspects as improvements or supplementations to the respective basic form of embodiments of the invention.

BRIEF DESCRIPTION

Some of the embodiments will be described in detail, with references to the following Figures, wherein like designations denote like members, wherein.

DETAILED DESCRIPTION

Figure 1:
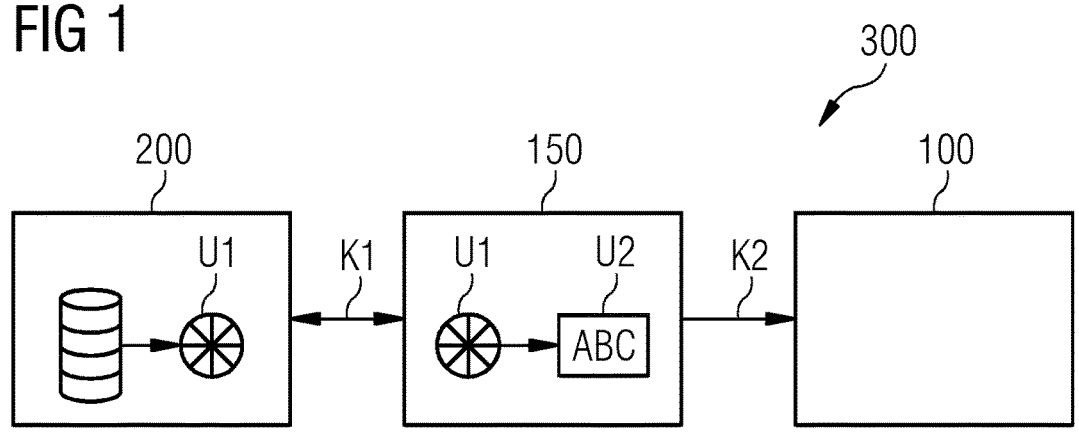
FIG. 1 shows a schematic block diagram of a first exemplary embodiment of an automation system.

FIG. 1 shows a schematic block diagram of a first exemplary embodiment of an automation system 300, which is an industrial production installation, for example. Without restricting the generality, the industrial production installation 300 in this instance has only one field device 100, which is a control computer of the industrial production installation 300, for example. The control computer 100 can be used to control the production by the industrial production installation 300, for example. If the industrial production installation 300 is extended by individual machines and/or altered, this needs to be configured accordingly on the control computer 100. This requires an appropriately trained user, for example a service engineer, to register on the control computer 100 in order to perform this configuration, this also being referred to as administration of the control computer 100.

The user needs to have the appropriate rights in order to be permitted to make changes to the configuration. To this end, an administrator account is set up on the control computer 100, for example. The administrator account is in particular protected by a strong password, which is 250 characters long, for example, and contains a random mixture of uppercase and lowercase letters, numbers and special characters. Inputting such a password manually would be very time-consuming and error-prone. The user therefore carries a mobile device 150, which in this instance is in the form of a smartphone. As soon as the user is at the control computer 100, he uses a specific application in the smartphone 150, for example, to initiate the registration process. The smartphone 150 makes a communication connection K1 to a security device 200, which in this instance is in the form of a server. The server 200 has a cryptographic memory system that stores access data for a multiplicity of users and/or a multiplicity of field devices 100. At the request of the smartphone 150, the server 200 takes the identity of the user and of the field device on which he wishes to register as a basis for providing user information U1 and transmits the information to the smartphone 150.

The smartphone 150 receives the user information U1 and generates registration information U2 therefrom, which in this instance comprises an access name for administrator access and the associated password, for example. In particular, the smartphone 150 accomplishes this by decrypting the received user information U1. There may also be provision for the smartphone 150 to forward the received user information U1 unchanged as the registration information U2.

Using a transmission link K2, the smartphone 150 then transmits the registration information U2 to the field device 100 in order to log the user into the administrator account. The transmission link K2 is a wireless transmission connection, for example; it may in particular also be a signal transmission by an optical, acoustic and/or mechanical route. By way of example, the smartphone could display the registration information U2 as a barcode or a QR code on a screen, and a camera (not shown) arranged on the control computer 100 captures the screen content of the smartphone 150.

The user can therefore easily register with the control computer 100, which is protected by a very strong password, as an administrator.

The method described can be used if the field device 100 does not permit remote access, for example via the Internet.

Figure 2:
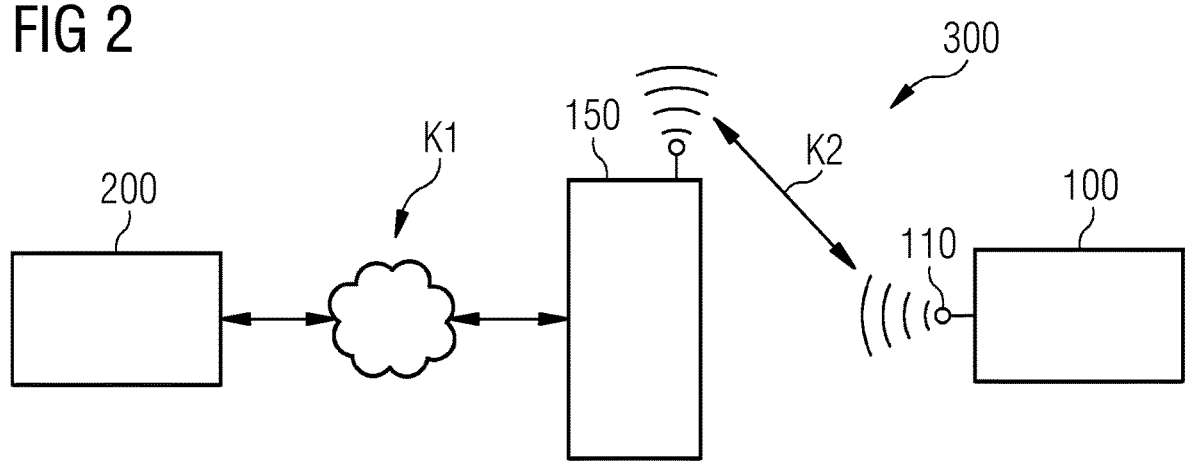
FIG. 2 shows a schematic block diagram of a second exemplary embodiment of an automation system.

FIG. 2 shows a schematic block diagram of a second exemplary embodiment of an automation system 300. The second exemplary embodiment has the same features as the first exemplary embodiment, additional features being described below.

By way of example, the field device 100 in this example is a measuring device that is obsolete and operated using obsolete and insecure control software. The measuring device 100 therefore has no Internet access and can be administered only in situ. Apart from relatively old interfaces, such as for example RS-232, PS/2 or USB 1.0, the measuring device 100 furthermore has no communication interfaces. In order to achieve automated registration of the user, the measuring device 100 has been equipped with a receiving apparatus 110, which in this instance is in the form of a USB dongle that registers with the measuring device 100 as a keyboard. The USB dongle 110 is in particular configured for making an NFC connection K2.

In order to register with the measuring device 100, the user uses the mobile device 150, which is in the form of a smartphone, to retrieve user information U1 from a central security device 200 via a communication connection K1, which in this instance is in the form of a mobile radio connection (see FIG. 1). The smartphone 150 generates the registration information U2 from this user information U1 (see FIG. 1). The user then brings the smartphone 150 close to the USB dongle 110, the smartphone 150 setting up the NFC connection K2 to the USB dongle 110 and using this connection K2 to transmit the registration information U2.

The USB dongle 110 receives the registration information U2 and outputs it to the measuring device 100, the measuring device 100 in this instance using the USB port to receive the same signal as if the user were to input the registration information U2 using a physical keyboard.

The user is therefore automatically registered on the measuring device 100, which is why a strong password can be used to protect access in this case too without registration being a problem.

Figure 3:
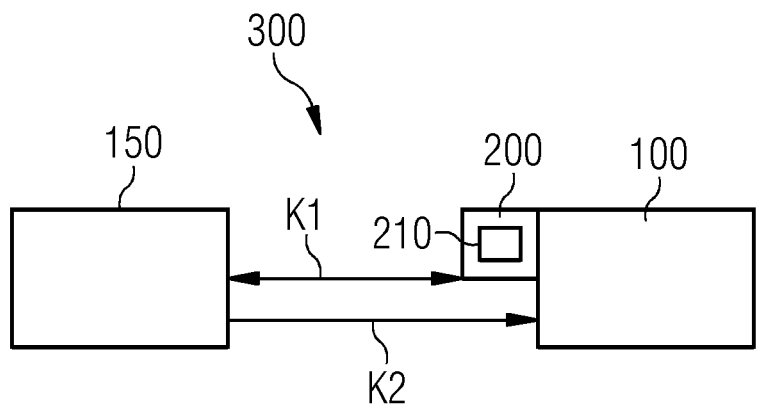
FIG. 3 shows a schematic block diagram of a third exemplary embodiment of an automation system.

FIG. 3 shows a schematic block diagram of a third exemplary embodiment of an automation system 300. The depicted automation system 300 is for example a security-critical system, such as a power station. Only one field device 100 is depicted in this instance too without restricting the generality.

For security reasons, it is undesirable, in the case of the power station 300, for access data such as user information U1 (see FIG. 1) or registration information U2 (see FIG. 1) to be stored outside the power station 300 and/or centrally. The security device 200 is therefore arranged locally to the field device 100. Furthermore, there is a communication connection to the outside neither from the security device 200 nor from the field device 100.

The user therefore needs to be physically present in order to administer the field device 100. To this end, the user uses his mobile device 150 to make a local communication connection K1 to the security device 200, for example an NFC connection. The security device 200 comprises an access data memory 210 that stores access data for a plurality of users, for example. The user information U1 associated with the user is read from the access data memory 210 by the security device 200 and transmitted to the mobile device 150 via the communication connection K1. The user information U1 is in particular cryptographically protected by OTP (one time pad), so that the user or the mobile device first needs to generate an appropriate cryptographic key that can be used to decrypt the information. In this way, the registration information U2 is generated in a cryptographically secure manner.

The registration information U2 is transmitted from the mobile device 150 to the field device 100 or to a receiving apparatus 110 via a local communication connection K2, for example Bluetooth (see FIG. 2). This automatically logs in the user on the field device 100.

Subsequently, the user can use the local communication connection K2 to convey further administration inputs to the field device 100, so that administration of the field device 100 by the mobile device 150 is possible. In particular, the administration can also take place fully automatically after registration of the user, for example by virtue of predetermined scripts and/or command sequences being transmitted from the mobile device 150 to the field device 100.

Figure 4:
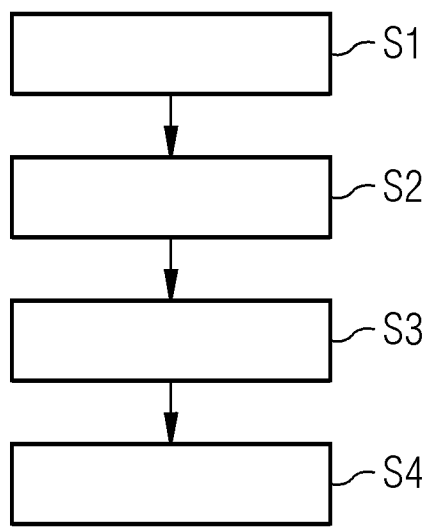
FIG. 4 shows a schematic block diagram of an exemplary embodiment of a method for automatically registering a user on a field device.

FIG. 4 shows a schematic block diagram of an exemplary embodiment of a method for automatically registering a user on a field device 100 (see FIGS. 1-3).

In a first step S1, user information U1 (see FIG. 1) is provided on the basis of an identity of the user and an identity of the field device 100 by a security device 200 (see FIGS. 1-3). In particular, the user information U1 is read from a cryptographically protected memory, such as for example an access data memory 210 (see FIG. 3). There can be provision for authentication of the user and/or of the mobile device 150 (see FIGS. 1-3).

In a second step S2, the provided user information U1 is transmitted to the mobile device 150 of the user. The transmission in this instance can take place via a wired or wireless communication connection K1 (see FIGS. 1-3). To increase security, the communication connection K1 can be a local connection that permits only a short distance between the mobile device 150 and the security device 200. The transmission takes place in cryptographically protected fashion, that is to say in particular in encrypted fashion.

In a third step S3, the mobile device 150 generates field-device-specific registration information U2 (see FIG. 1) on the basis of the transmitted user information U1. By way of example, the mobile device 150 decrypts the user information U1 transmitted in encrypted fashion.

In a fourth step S4, the user is registered on the field device 100 by the generated registration information U2. The registration takes place automatically, in particular, that is to say without the user needing to input the registration information U2 himself. To this end, there is in particular provision for a local communication connection K2 (see FIGS. 1-3) from the mobile device 150 to the field device 100 or to a receiving apparatus 110 coupled to the field device 100 (see FIG. 2). The transmission of the registration information U2 via the communication connection K2 takes place in encrypted fashion, in particular. The registration information can also be kept secret from the user himself, which increases security further.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatically registering a user on a field device for the purpose of administering the field device, comprising:
providing the field device, wherein the field device does not have access allowing administering of the field device over the internet,
providing user information on the basis of an identity of the user and an identity of the field device by a security device wherein the security device is configured for cryptographically storing user information for multiple field devices and wherein the security device is not connected to the internet,
transmitting the provided user information to a mobile device of the user by the security device using a local communication connection,
generating field-device-specific registration information on the basis of the transmitted user information by the mobile device, and
registering the user on the field device by the generated registration information.

2. The method as claimed in claim 1, wherein the security device is arranged locally to the field device.

3. The method as claimed in claim 1, wherein the security device is configured for cryptographically secure storage of access data for at least one user group from a plurality of user groups of the field device.

4. The method as claimed in claim 1, wherein there is provision for a receiving apparatus, couplable to the field device, that registers on the field device as an interface device and that uses a communication connection to the mobile device to receive the registration information from the mobile device and registers the user on the field device.

5. The method as claimed in claim 4, wherein the mobile device sends an administration input for administering the field device to the receiving apparatus in addition to the registration information and after the user has been registered on the field device.

6. The method as claimed in claim 1, wherein the mobile device generates the registration information by a cryptographic method on the basis of the user information.

7. The method as claimed in claim 1, wherein step a) comprises authentication of the user on at least one of the mobile device and/ the security device.

8. An automation system having a number of field devices and at least one security device, wherein the at least one security device is configured for cryptographically storing user information for the number of field devices and wherein the security device is not connected to the internet, wherein each field device from the number of field devices is administrable by at least one user, wherein administering a respective instance of the field devices requires registration with the respective field device by field-device-specific registration information and administering is not permitted over the internet, wherein a mobile device of the at least one user is configured for retrieving user information from the at least one security device on the basis of an identity of the at least one user and an identity of the respective field device, wherein the user information is retrieved using a local communication connection, and wherein the mobile device is configured for generating the field-device-specific registration information on the basis of the retrieved user information and for outputting the generated registration information.

9. The automation system as claimed in claim 8, wherein the number of field devices forms a local group, wherein the security device is arranged locally to the group.

10. The automation system as claimed in claim 8, wherein at least one of the field devices from the number of field devices has a coupled receiving apparatus that registers on the field device as an interface device, wherein the mobile device is configured for making a communication connection to the receiving apparatus, wherein the mobile device is configured for transmitting the registration information to the receiving apparatus via the communication connection and the receiving apparatus is configured for registering the at least one user on the field device.

11. The automation system as claimed in claim 10, wherein the mobile device is configured for generating an administration input for administering the field device and for transmitting the administration input to the receiving apparatus after the at least one user has been registered on the field device.

12. The automation system as claimed in claim 8, wherein the mobile device is configured for at least one of retrieving the user information and generating the registration information by a cryptographic method.

13. The automation system as claimed in claim 8, wherein the communication connection for transmitting the registration information is a local communication connection.

14. The method as claimed in claim 1, wherein the mobile device leaves the transmitted user information unchanged in terms of content and puts the transmitted user information into a data format readable by the field device and/or packs the transmitted user information into a data packet transmittable in accordance with a specific protocol.

15. The automation system as claimed in claim 8, wherein the mobile device is also configured to leave the retrieved user information unchanged in terms of content and put the retrieved user information into a data format readable by the field device and/or to pack the retrieved user information into a data packet that can be transmitted in accordance with a specific protocol.

16. A method for automatically registering a user on a field device for the purpose of administering the field device, comprising:
   providing the field device, wherein the field device has obsolete control software and/or does not have access allowing administering of the field device from the internet,
   providing a receiving apparatus and coupling the receiving apparatus to the field device as an interface device,
   providing user information on the basis of an identity of the user and an identity of the field device by a security device, wherein the security device is configured for cryptographically storing user information for multiple field devices and wherein the security device is not connected to the internet,
   transmitting the provided user information to a mobile device of the user by the security device,
   generating field-device-specific registration information on the basis of the transmitted user information by the mobile device,
   transmitting the field-device-specific registration information to the receiving apparatus by the mobile device using a communication connection,
   outputting the field-device-specific registration information to the field device, and
   registering the user on the field device.

17. The method as claimed in claim 16, wherein the communication connection is a near field communication connection.

18. The method as claimed in claim 16, wherein the receiving apparatus comprises a USB dongle.

* * * * *